(12) United States Patent
Robl et al.

(10) Patent No.: US 6,533,848 B1
(45) Date of Patent: Mar. 18, 2003

(54) TECHNOLOGY AND METHODOLOGY FOR THE PRODUCTION OF HIGH QUALITY POLYMER FILLER AND SUPER-POZZOLAN FROM FLY ASH

(75) Inventors: Thomas L. Robl, Sadieville, KY (US); John G. Groppo, Wilmore, KY (US)

(73) Assignee: University of Kentucky Research Foundation, Lexington, KY (US)

( * ) Notice: Subject to any disclaimer, the term of this patent is extended or adjusted under 35 U.S.C. 154(b) by 0 days.

(21) Appl. No.: 09/804,829

(22) Filed: Mar. 13, 2001

Related U.S. Application Data

(60) Provisional application No. 60/188,876, filed on Mar. 13, 2000.

(51) Int. Cl.[7] .............................................. C04B 18/06
(52) U.S. Cl. ................................ 106/DIG. 1; 209/166
(58) Field of Search ..................... 209/166; 106/DIG. 1

(56) References Cited

U.S. PATENT DOCUMENTS

| | | |
|---|---|---|
| 1,984,386 A | 12/1934 | Tschudy |
| 2,431,560 A | 11/1947 | Humphreys |
| 2,835,387 A | 5/1958 | Fontein |
| 3,794,250 A | 2/1974 | Brewer |
| 3,908,912 A | 9/1975 | Irons et al. |
| 4,121,945 A | 10/1978 | Hurst et al. |
| 4,323,449 A | 4/1982 | Pelletier |
| 4,336,284 A | 6/1982 | Wallace |
| 4,388,181 A | 6/1983 | Rainis et al. |
| 4,392,981 A | 7/1983 | Corbeels et al. |
| 4,412,839 A | 11/1983 | Taylor |
| 4,426,282 A | 1/1984 | Aunsholt |
| 4,652,433 A | 3/1987 | Ashworth et al. |
| 4,669,397 A | 6/1987 | Galgana et al. |
| 4,686,031 A | 8/1987 | Lisowyj et al. |
| 4,883,586 A | 11/1989 | Bierman et al. |
| 4,961,843 A | 10/1990 | Lewis |
| 5,047,145 A | 9/1991 | Hwang |
| 5,227,047 A | 7/1993 | Hwang |
| 5,452,805 A | 9/1995 | Robertson et al. |
| 5,456,363 A | 10/1995 | Groppo et al. |
| 5,535,892 A | 7/1996 | Moorhead et al. |
| 5,762,702 A | 6/1998 | Guy |
| 5,817,230 A | 10/1998 | Groppo, Jr. et al. |
| 5,936,216 A | 8/1999 | Wu |

*Primary Examiner*—Paul Marcantoni
(74) *Attorney, Agent, or Firm*—King & Schickli, PLLC

(57) ABSTRACT

A novel method for producing fly ash material with a range of particle sizes from about 2.0 to about 4.0 μm is provided utilizing superplasticizers. The method produces fly ash material suitable for use as filler material in the plastics industry and super pozzolan for the concrete industry.

20 Claims, 4 Drawing Sheets

TECHNOLOGY AND METHODOLOGY FOR THE PRODUCTION OF HIGH QUALITY POLYMER FILLER AND SUPER-POZZOLAN FROM FLY ASH

This application claims the benefit of Provisional application Ser. No. 60/188,876, filed Mar. 13, 2000.

TECHNICAL FIELD

The present invention relates to a method for producing a filler material suitable for use in the plastics and concrete industries from fly ash. More specifically, this invention relates to a method for reducing particle flocculation, thereby allowing production of a fly ash-based filler material containing a narrow range of particle sizes.

BACKGROUND OF THE INVENTION

Plastics have become the dominant material of our age, replacing wood, metal and ceramics. Plastic products almost never contain the pure polymer but are compounded materials containing plasticizers, antioxidants, biocides, UV blockers, fire and smoke retardants, coloring agents (stains and pigments) and mineral fillers. Substances previously used as mineral fillers include naturally occurring or precipitated calcium carbonate ($CaCO_3$, primarily as calcite), aluminum trihydroxide ($Al(OH)_3$ or ATH), calcium silicate ($CaSiO_3$, as Wollastinite), carbon black, titanium dioxide ($TiO_2$, rutile), ground fiberglass, ground glass, talc and fly ash. The total usage and value of fillers is difficult to estimate as much of the production of fillers and additives is tightly controlled. However, filler production is in the range of millions of tons with monetary value in the billions of dollars.

Mineral fillers have two major functions in the plastics industry. First, they may be utilized as material extenders to displace the resin or polymer and reduce the overall cost of the product. Second, they may be used as material modifiers to change the physical characteristics of the final product. Thermoplastic polymers filled with rigid inorganic particles display higher values of Young's modulus, better thermal stability and lower wear under friction than unfilled polymers. However, certain prior art mineral fillers may also greatly reduce the polymer tensile strength, disadvantageously contributing to embrittlement.

Addition of other prior art fillers such as calcite or talc to plastics causes problems in the compounding step by entraining air. Also, these materials greatly increase the viscosity of the melt, making injection molding more difficult. The shape and texture of the siliceous glassy portion of fly ash provide certain superior and desirable attributes as a mineral filler for, e.g., plastics. The smooth round surface of fly ash reduces both air entrainment and melt viscosity compared to other fillers. Lower melt viscosity also improves the dispersion of the filler in the melt. The roundness of the fly ash particle further results in reduced abrasiveness compared to materials such as ground glass or wollastinite.

Accordingly, fly ash has been used as a filler at low loadings (1% to 2%) since the 1950's to improve the stiffness of some plastic. However, certain disadvantageous properties of fly ash have limited its widespread usage. Untreated fly ash contains a broad range of particle sizes and, compared to more commonly used fillers, is very coarse. As an example, a high quality ground calcite based mineral filler would typically have a median particle size ($D_{50}$) of from 2 to 5 $\mu$. The presence of significant amounts of coarse material greatly contributes to the loss of strength of the filled polymer. Also, untreated fly ash contains carbon char particles and "magnetite" particles (a highly substituted iron-rich spinel) which are undesirable as they adversely affect color, increase the bulk density and may cause problems with polymer crystallization.

Beneficiation of fly ash is required in order to produce a quality mineral filler. Contaminants must be removed, and the finest particle sizes separated efficiently. It is known in the art to accomplish such beneficiation of fly ash for use as, e.g., an admix in concrete, by such means as hydraulic classification and flotation separation. Accordingly, consideration was given to simply extending the severity of the hydraulic classification step as described in U.S. Pat. No. 5,817,230 to Groppo et al., incorporated herein by reference and describing a method for producing an improved pozzolan. Briefly, this technology employs hydraulic classification to remove the coarse ash as well as dense magnetite particles. A second screen may be employed to recover very light materials and/or plant debris if it is encountered, as in the case for fly ash recovered from a landfill or sediment pond. This step is then followed by froth flotation to recover the carbon and reduce the loss on ignition to acceptable levels.

However, merely extending the severity of hydraulic classification was found unsuitable. Two different phenomena had to be overcome to beneficiate the fly ash sufficiently to produce a suitable filler grade fly ash material for plastics, concrete, and the like. First, the problem of hindered or "blanket" settling had to be addressed. Blanket settling refers to the phenomena whereby in a mix with differing particle sizes all of the particles settle concomitantly due to larger particles entraining smaller particles and hindering their movement. Thus no differentiation based upon particle diameter is possible. Blanket settling is generally known to occur in particulate materials with high pulp densities and large differences in particle sizes such as untreated fly ash.

It is also known that fly ash tends to flocculate in water, thereby further reducing the ability to differentiate based on particle size. The flocs formed are remarkably stable even at elevated pH values. It is believed that the surface of the siliceous particles of fly ash have a less strong or dense surface charge compared to naturally occurring minerals. It is known that generally, natural flocculation can only occur if the surface charges of the particles are at or near the point of zero charge (PZC).

Accordingly, there is need in the art for a method of treatment of fly ash for removal of contaminants and efficient separation of the finest particle sizes to result in a suitable filler material for, e.g., plastic polymers, concrete, and cement. To have practical economic value, the recovery efficiency of the small particles (i.e. yield) must be relatively high. The end product must also have a very small median particle size with a narrow size range distribution, with minimal contamination by larger particle sizes. Finally, the technology must operate at reasonable feed pulp density to generate product at a reasonable rate to allow the use of generally available conventional equipment.

SUMMARY OF THE INVENTION

In accordance with the purposes of the present invention as described herein, a process for producing fly ash filler material with a uniform mean particle size in the range of 2–4 $\mu$m is provided. The fly ash provided by the method of this invention is suitable as a filler material for, e.g., plastic polymers, mortar, and concrete. In one aspect, the method of the present invention comprises the step of slurrying fly ash in water in the presence of a superplasticizer, followed by elutriating the resulting slurry by any suitable means such as an elutriation column or a hydraulic classifier. Suitable superplasticizers may be selected from the group including, but not limited to, sulphonated naphthalene-formaldehyde condensate, sulphonated melamine-formaldehyde condensate, polycarboxylates and any mixture thereof The superplasticizer of choice may be added to the slurry at a concentration of from about 1.0 g/kg of fly ash to about 8.0 g/kg of fly ash. In a preferred embodiment of the present invention, the superplasticizer is added to the slurry to near saturation, but preferably maintained below the saturation point.

In another aspect, the method of the present invention is conducted at a pH range of from about 7.5 to about 10.5. In one preferred embodiment of this invention, the method is conducted utilizing fresh fly ash at a pH range of from about 8.0 to about 9.5. In a particularly preferred embodiment, the method is conducted utilizing fresh fly ash at a pH range of from about 8.0 to about 8.9. In another preferred embodiment, the method is conducted on stored fly ash at a pH range of from about 9.5 to about 10.5. The method of this invention provides for adjusting the pH of the fly ash/water slurry to a desired range as described above.

In still another aspect of this invention, a composition for use in mortar and concrete is provided wherein fly ash filler material (super pozzolan) having a mean particle size in the range of 2–4 μm is added in a sufficient amount to replace 20–30% of the added cement.

In yet still another aspect of this invention, a plastic polymer composition is provided wherein 20–30% of any suitable plastic polymer is replaced by fly ash filler material having a mean particle size of 2–3 μm.

Other objects of the present invention will become apparent to those skilled in this art from the following description wherein there is shown and described a preferred embodiment of this invention, simply by way of illustration of the modes currently best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification illustrates several aspects of the present invention and, together with the description, serves to explain the principles of the invention. In the drawing.

Figure 1A:
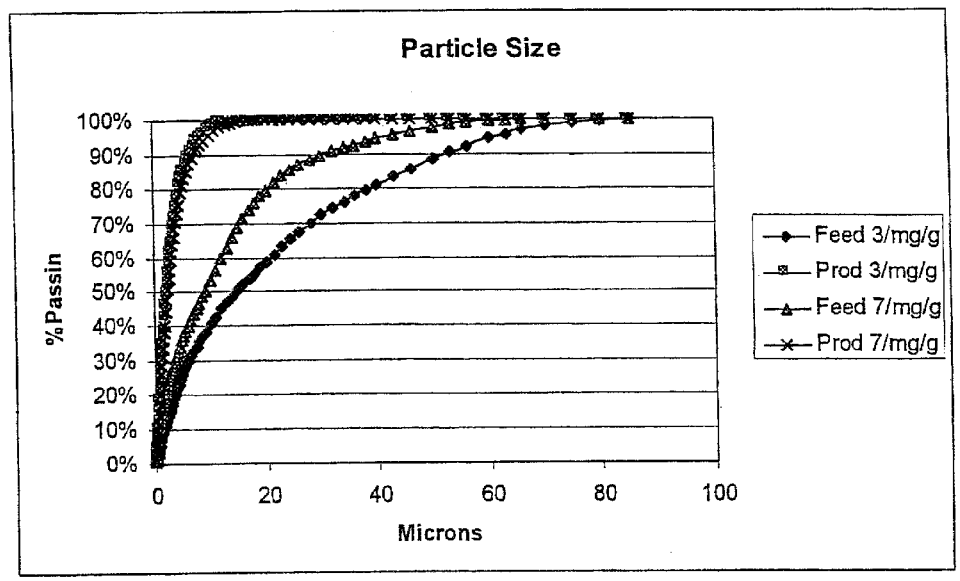
FIGS. 1a and 1b show particle size and recovery efficiency (yield) for fly ash treated with 3.1 mg/g and 7.0 mg/g SNF condensate: (a) Plot of particle size and feed for fly ash treated with 3.1 mg/g and 7.0 mg/g SNF condensate; (b) Relative recovery efficiency (yield) by particle size.

Reference will now be made in detail to the presently preferred embodiments of the invention, examples of which are illustrated in the accompanying drawing.

DETAILED DESCRIPTION OF THE INVENTION

As summarized above, the present invention relates to a novel method for production of a suitable filler material from fly ash for use in industries such as the plastics and cement industries, and to novel mortar, concrete, and plastic polymer compositions derived therefrom. Attempts to recover suitable filler grade material from fly ash through simple hydraulic classification in a variety of classifier geometries and at natural pH (i.e. 6.5 to 8.9) fail to produce an efficient separation. It has been observed that in all cases, the fine materials form flocs. Prior attempts to disperse the flocs using known pH modifiers such as sodium silicate and potassium hydroxide have been unsuccessful. Similarly, attempts to disperse flocs using sonication met with indifferent results. Some success has been achieved using potassium metaphosphate and pyrophosphate. However, results have been erratic and highly substrate dependent. Accordingly, it was necessary to identify another approach which did not suffer from the disadvantages of: (1) high degree of substrate dependence; (2) low yield; and (3) erratic or irreproducible yield.

It is known in the cement and concrete industries to use compounds known as "superplasticizers." Superplasticizers are a group of organic water soluble polymers with long molecules of high molecular mass, primarily used in the cement and concrete industries for their dispersion and water reduction properties. They effectively disperse the portland cement particles in hydrated concrete, thereby reducing water requirements and resulting in stronger concrete. These chemical compounds include polynapthalene sulphonate (PNS), which is also known as sulphonated napthalene formaldehyde condensate (SNF-condensate). A second family of sulphonate based superplasticizers includes polymelamine sulphonates (PMS), also known as sulphonated melamine formaldehyde condensate (SMF-condensate). A third family of superplasticizers includes carboxylated synthetic polymers. These latter polymers are highly effective dispersants and include polycarboxylates such as polyacrylates.

Surprisingly, superplasticizers have been found to be effective anti-flocculating agents (dispersants) for the production of fly ash suitable as filler material in accordance with the method of this invention. Superplasticizers achieve dispersion in a somewhat different manner compared to conventional reagents. It is believed that the long molecules envelop individual ash particles and attached ionic groups, increasing the overall negative charge of the particle and causing electrostatic repulsion. The large size and geometries of the superplasticizer molecules may also impart steric hindrance, further reducing the ash particles' ability to flocculate.

Accordingly, the present invention provides a method for producing suitable filler material for various industries utilizing superplasticizers to reduce or eliminate flocculation of fly ash particles in water. The charge density on the ash particles is much higher with superplasticizers than can be attained with conventional dispersants. While not wishing to be bound by any particular theory, it is believed that superplasticizers are more effective on fly ash than other known dispersants because the ash surface is smooth, glassy, probably partially hydrated, and possesses decreased surface charge density in comparison to other minerals.

In a presently preferred embodiment of this invention, fly ash is first slurried with an effective amount of water. To achieve fly ash with very low loss on ignition, the ash is slurried with water to a concentration of from about 5% to about 10% solids. Advantageously, the method of this invention is suitable for use at the pH expected by simply mixing fly ash with water. Preferably, the method of the present invention is conducted at a pH range of from about 7.5 to about 10.5. In one preferred embodiment of this invention, the method is conducted utilizing fresh fly ash at a pH range of from about 8.0 to about 9.5. In a particularly preferred embodiment, the method is conducted utilizing fresh fly ash at a pH range of from about 8.0 to about 8.9. In yet another preferred embodiment, the method is conducted using stored fly ash at a pH range of from about 9.5 to about 10.5. If necessary, the method of this invention provides for adjusting pH to the desired alkalinity with a base such as $Na_2CO_3$, NaOH, or the like.

If the fly ash is excessively coarse, it is possible to subject the slurry to a preliminary hydraulic classification step to remove the coarsest material prior to addition of superplasticizer. Fly ash recovered from a pond or landfill, or fly ash with excessively high carbon content can first be subjected to hydraulic classification and froth flotation as described in U.S. Pat. Nos. 5,456,363 and 5,817,230, incorporated herein by reference. Of course, if the fly ash has a naturally low carbon content, the froth flotation step may be omitted.

The next step is to add superplasticizer at an appropriate concentration for the properties of the fly ash being treated. It has been found that best results for this method are achieved when superplasticizer is added to the fly ash/water slurry at near-saturation concentrations, while maintaining the concentration of superplasticizer below saturation. Addition of superplasticizer in excess of saturation disadvantageously results in reduction in final product quality (grade). In a presently preferred embodiment of this invention, superplasticizer is added to the fly ash/water slurry at a concentration of from about 1 g/Kg to about 8 g/Kg of fly ash material. The amount required varies from 1 g/Kg to about 8 g/Kg of fly ash material depending upon a number of factors, including the water hardness and the presence of porous carbon. The most appropriate superplasticizer concentration for a particular fly ash may be determined by various methods, such as adsorption studies combined with observation of settling behavior of the ash slurry prior to production scale purification of fly ash. The last step is elutriation of the slurry in a column or an appropriate hydraulic classifier operated under laminar flow conditions.

Use of superplasticizers provides effective deflocculation of fly ash particles, advantageously being effective at pH in the range from 7.5 to 10.5. This pH range is, for the most part, within the natural range of pH achieved by simply suspending fly ash in water, thereby minimizing problems from excessive scaling resulting from adjusting pH of fly ash slurries to more severe alkaline ranges. However, it should be appreciated that pH can be adjusted as necessary to achieve the desired range.

Pulp feeds as high as 8%–9% solids can be used in this invention without a significant deterioration of recovery efficiency. In a preferred embodiment of this invention, a pulp feed range of 5%–7% solids is utilized. A typical fly ash produces an end product stream at densities in excess of 2% solids under these conditions.

Advantageously, the use of superplasticizers eliminates the need for complex hydraulic classifier designs. The method of this invention achieves suitable fly ash filler material preparations using simple elutriation columns or troughs. As long as laminar flow conditions are maintained and residence times are kept congruent with the dictates of Stokes Law, suitable yields and grades of fly ash are achieved utilizing the present method.

Commercially available hydraulic classifiers, such as are described in U.S. Pat. No. 4,961,843 to Lewis (incorporated herein by reference) or simple modifications thereof, are acceptable for a classifier vessel. The geometry of the vessel is not important. Any vessel geometry is suitable for the method of this invention, as long as it allows: 1) the coarse material to freely settle so that the suspended fine material can be elutriated; and 2) sufficient residence time to allow the coarse material to settle and effect separation. This in turn requires that the samples be fully dispersed so that the dictates of Stokes Law prevail. Accordingly, in accordance with the method of this invention the various particle sizes settle differentially, preventing the phenomenon of blanket settling.

The compositions and methods of the present invention may be accomplished by various means which are illustrated in the examples below. These examples are intended to be illustrative only, as numerous modifications and variations will be apparent to those skilled in the art.

EXAMPLE 1

Initial experiments at a laboratory scale were conducted to determine appropriate superplasticizer dosages and residence time effects on total fly ash product yield and grade. Fly ash was initially subjected to froth flotation to reduce carbon content, and screened to <200 mesh to remove excessively coarse particulate matter. The ash was then blended with water in a 55-gallon drum and mixed with a high-speed mixer. The final sample proportions were:

160.6 kg of water
9.94 kg fly ash
29.9 g SNF-condensate (final SNF-condensate concentration=3.1 mg/g fly ash)
pH=8.7

It was unnecessary to adjust pH of the sample in this particular example. However, the method of this invention provides for adjusting pH of the sample to the desired range with a base, e.g., sodium carbonate. This step may be necessary if particularly acidic water is utilized in forming the fly ash/water slurry.

The sample was then pumped into a 6-inch diameter elutriation tube, which was maintained at an angle of approximately 45°. The volume of the tube was 6934 ml, with the sample inlet positioned above the outlet. The slurry was introduced at the upper part of the top of the tube and the fine material or product was elutriated from a tube along the side of the vessel. The coarse underflow material was removed from the bottom of the back part of the tube.

Fly ash/water/SNF-condensate slurry was pumped into the elutriation tube at a rate of 452 ml/min and the flow was allowed to reach equilibrium. Residence time in the tube was 15.3 min, and the percent feed solids was 5.7%. The percent solids concentration of the end product was 0.19%, for a calculated percent yield of 3.3%.

EXAMPLE 2

A slurry as described in Example 1 was prepared, and pumped into the elutriation tube at a feed rate of 603 ml/min. Residence time in the tube was 11.5 min, and the percent feed solids was 5.0%. The percent solids concentration of the end product was 0.34%, for a calculated percent yield of 6.8%.

EXAMPLE 3

A fly ash slurry was prepared as described in Example 1, except that the SNF-condensate concentration was increased to 7.0 mg/g fly ash. The slurry was pumped into the elutriation tube at a feed rate of 480 ml/min. Residence time in the tube was 14.5 min, and the percent feed solids was 5.8%. The percent solids concentration of the end product was 1.89%, for a calculated percent yield of 33%.

EXAMPLE 4

The slurry as described in Example 3 was pumped into the elutriation tube at a feed rate of 389 ml/min. Residence time in the tube was 17.8 min, and the percent feed solids was 5.7%. The percent solids concentration of the end product was 1.45%, for a calculated percent yield of 26%.

Figure 1B:
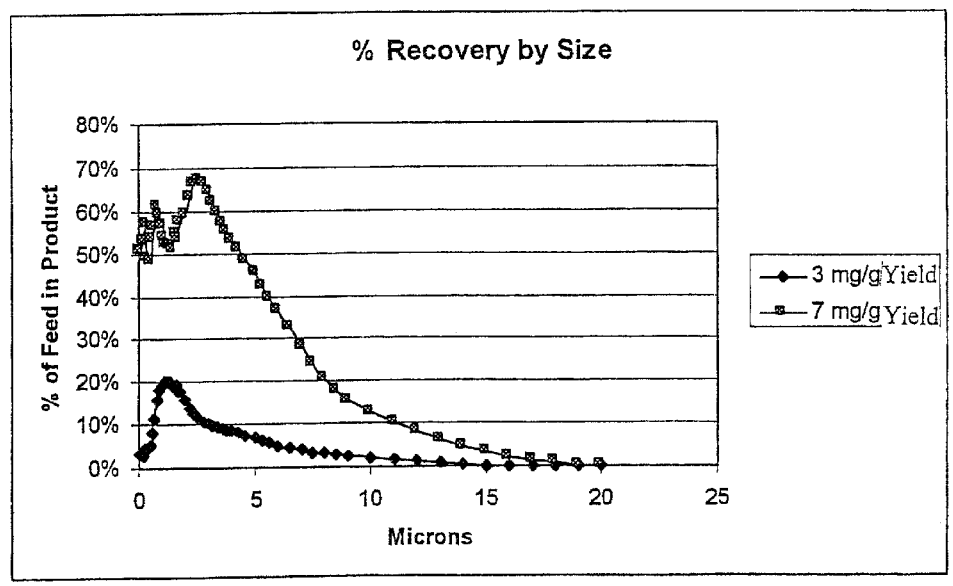

Accordingly, for the fly ash sample utilized in Examples 1–4, a concentration of about 7 mg SNF-condensate/g fly ash was required to fully deflocculate the ash. The grade curves are shown in FIGS. 1a and 1b for two concentrations of SNF-condensate (3.1 mg/g and 7.0 mg/g). The higher yield produced acceptable grades of product with good recovery in the 1 to 5 micron range.

Figure 2:
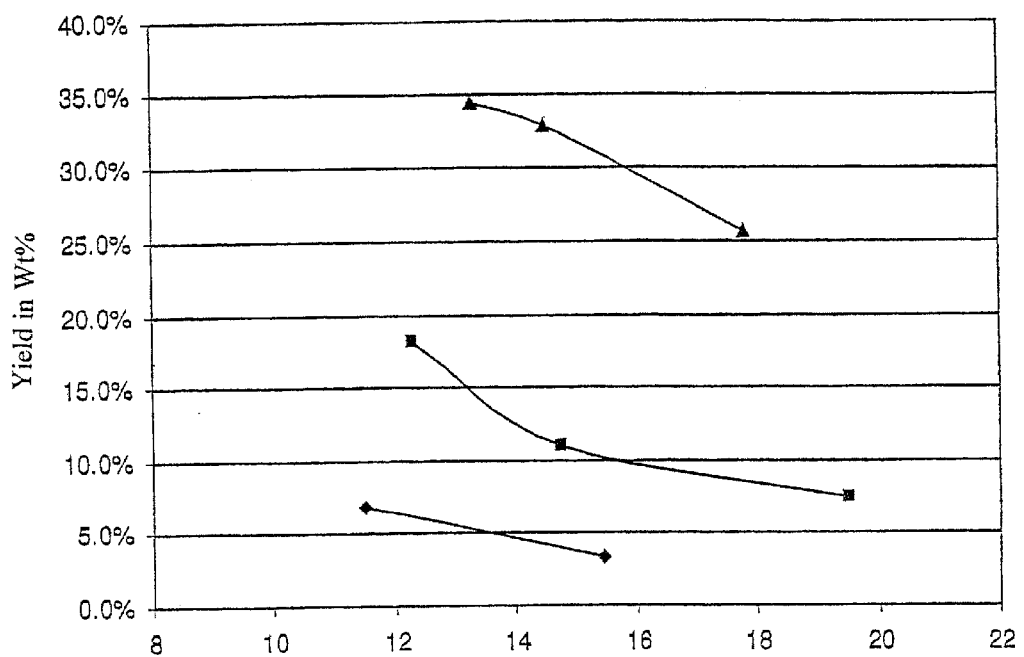
FIG. 2 shows effect of SNF-condensate concentration and residence time on yield of fly ash filler material obtained from fly ash using the method of the present invention.

As noted, superplasticizers are effective for the method of this invention at concentrations of from about 1.0 to about 8.0 g/kg of fly ash. As best seen in FIG. 2, the concentration of the superplasticizer strongly affects the yield of the filler product, with addition of SNF-condensate at 7.0 mg/g fly ash providing significant improvements in yield.

Figure 3:
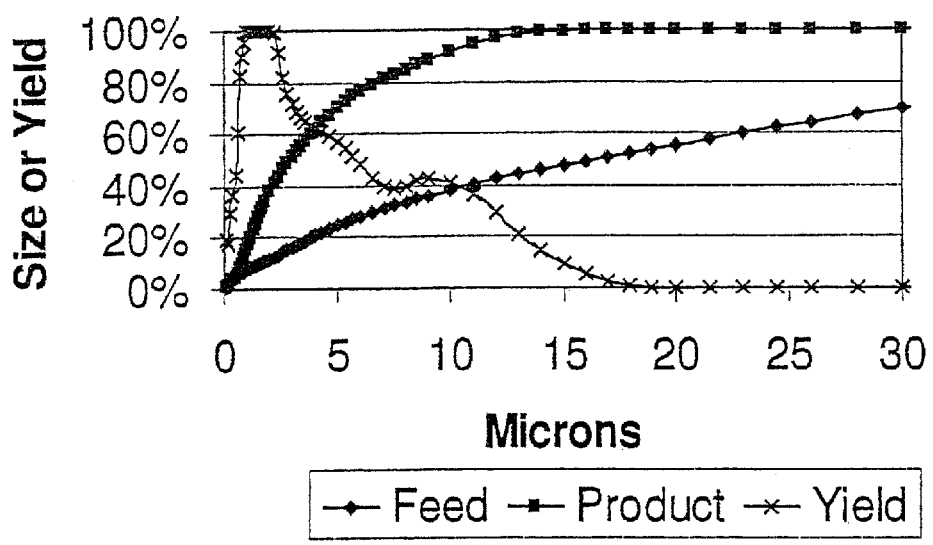
FIG. 3 shows distribution of feed and product, and percent recovery (yield) for a typical fly ash for the method of the present invention.

The use of superplasticizers to deflocculate the ash provides efficient recovery of the finest fractions of the ash at very high efficiencies. FIG. 3 presents the size curve for the product and for the feed for a typical fly ash. For example, recoveries (yield) of effectively 100% were typically obtained in the 1 to 2 $\mu$m size range. These results could be obtained for ash from both high and low sulfur coal. The process was effective for fly ash that had been stored in a pond or a landfill, as well as on fly ash received directly from a power plant.

EXAMPLE 5

The method of this invention further provides a practical means for recovering the very smallest particle sizes from fly ash, at very high yields and purity. Pilot plant tests were run on fly ash recovered from a high sulfur and a low sulfur coal. The ash was first subjected to froth flotation to reduce carbon content. The fly ash was then treated with SNF-condensate and classified hydraulically. As seen in Table 1, the final product had a median particle size ($D_{50}$) which ranged from 2.3 to 3.7 m$\mu$ with a recovery of almost 100% in the 0.9 to 2.0 micron size range. The iron and sulfur contents were greatly reduced: sulfur by almost 90% and iron by 25% to 35% (Table 2). Most importantly for filler applications, the particles which were magnetically susceptible were reduced to almost zero. Almost all the magnetic metallic oxide fraction of the fly ash was removed in the process along with other contaminants including carbon. This example demonstrates the utility of the method of this invention on both fresh fly ash, and fly ash recovered from landfills or impondments.

TABLE 1

Comparison of particle size distribution (in m$\mu$) between feed and products from pilot testing of filler technology. All samples were treated with SNF-condensate.

|  | Hi S Ash Feed | Pilot 1 | Pilot 2 | Low S Ash Feed | Pilot 1 | Pilot 2 |
|---|---|---|---|---|---|---|
| $D_{10}$ | 1.7 | 0.8 | 0.6 | 2.1 | 0.9 | 0.9 |
| $D_{50}$ | 20.5 | 3.2 | 2.3 | 24 | 3.3 | 3.7 |
| $D_{90}$ | 95 | 10 | 7 | 95 | 10 | 11 |
| $D_{100}$ | 150 | 22 | 11 | 150 | 17 | 22 |

TABLE 2

Comparison of chemical composition of feedstock from two different fly ashes with their products.

|  | Hi S Feed | Pilot 1 | Pilot 2 | Low S Feed | Pilot 1 | Pilot 2 |
|---|---|---|---|---|---|---|
| Ash | 95.98 | 98.30 | 98.18 | 96.39 | 98.64 | 98.62 |
| C | 3.71 | 1.37 | 1.38 | 3.42 | 1.12 | 1.05 |
| S | 1.22 | 0.11 | 0.16 | 0.68 | 0.07 | 0.03 |
| LOI | 4.45 | 2.26 | 2.39 | 3.87 | 2.06 | 2.28 |
| Density | 2.54 | 2.69 | 2.63 | 2.46 | 2.68 | 2.67 |
| $SiO_2$ | 45.12 | 51.28 | 50.54 | 63.27 | 61.35 | 58.51 |
| $Al_2O_3$ | 23.21 | 25.32 | 25.92 | 27.19 | 27.91 | 27.31 |
| $Fe_2O_3$ | 13.46 | 8.69 | 8.72 | 5.68 | 4.16 | 4.25 |
| $TiO_2$ | 1.14 | 1.29 | 1.31 | 1.48 | 1.64 | 1.72 |
| CaO | 4.05 | 2.55 | 2.60 | 0.01 | 0.73 | 0.79 |
| MgO | 0.47 | 0.59 | 0.42 | 0.11 | 0.35 | 0.16 |
| $K_2O$ | 1.73 | 2.00 | 2.06 | 2.18 | 2.34 | 2.39 |
| $Na_2O$ | 1.10 | 1.12 | 1.58 | 0.44 | 0.84 | 1.40 |
| $P_2O_5$ | 0.58 | 0.59 | 0.53 | 0.17 | 0.18 | 0.21 |

EXAMPLE 6

A pilot plant experiment was conducted on an ASTM Class F fly ash obtained from high sulfur bituminous coal. A standard open trough hydraulic classifier was utilized to separate varying particle sizes. The experiments described in this Example were preceded by additional experiments as described in Examples 1–5 to determine optimal concentrations of SNF-condensate and pH conditions. Initially, fly ash was subjected to a froth flotation step to remove carbon and screened to <100 mesh. A total of 140 kg of fly ash was mixed with water to achieve approximately 1350 liters of slurry with a density of 9.98% solids. The pH of the slurry was 8.7, and conductivity was measured at 660 $\mu$S. Accordingly, no adjustment of pH was required. Liquid SNF-condensate (660 g) was added, representing a final SNF-condensate concentration of 4.7 g/kg of fly ash. The sample was continuously stirred in a tank with two 10-inch diameter impellers driven by ½ horsepower electric motors to maintain the solids in suspension.

Figure 4:
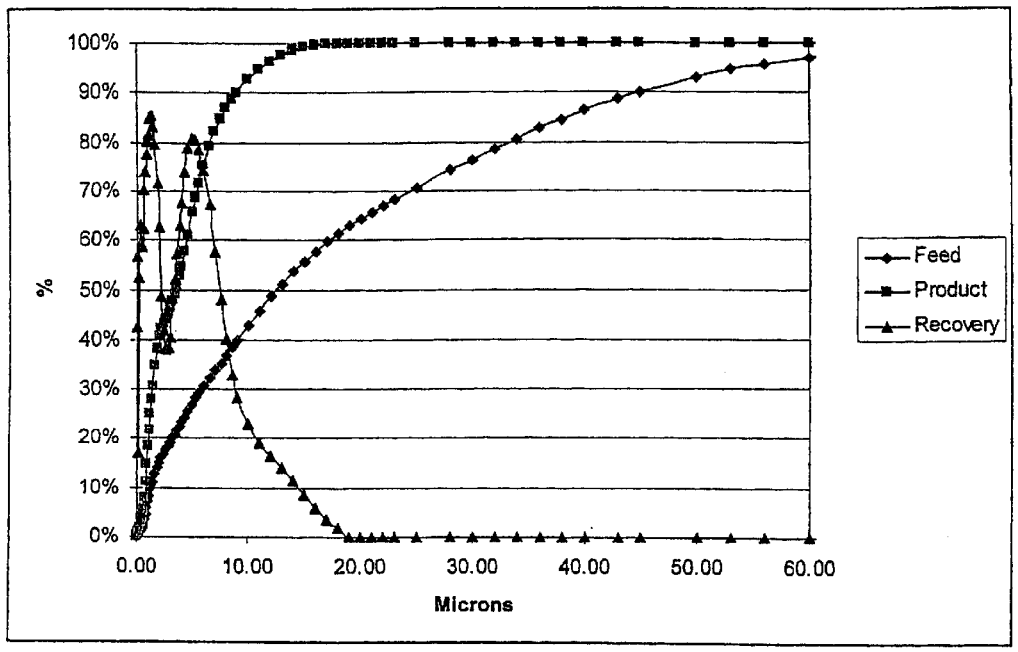
FIG. 4 shows distribution of feed and product, and percent recovery (yield) for fly ash recovered from a high sulfur bituminous coal.

The slurry was pumped through the horizontal classifier at a rate of from about 1.39 to about 1.53 L/min for about 9 hours. Flow rate was maintained at a steady rate for about 7 hours. The solids density of the end product ranged from about 2.3% to about 2.8% by weight, and final product yield varied from about 21% to about 28%. The grade of the product was relatively consistent. Average particle distribution of the feed and end product, and product yield are presented in FIG. 4. Particle $D_{50}$ ranged from 3.2 to 3.8 $\mu$m, and $D_{90}$ ranged from 8.5 to 10 $\mu$m. The largest particles measured in the final product ranged from about 17 to 22 $\mu$m.

Pilot test runs have been performed on six different fly ash samples. Feed densities have been varied from 4% to 10%, and end product density has varied from 0.9% to 30%. Yields have varied from 15% to 35%, partially as a function of the fineness of the feed sample. As needed, $Na_2CO_3$ or NaOH were added to achieve the desired sample alkalinity. Best results were achieved at a pH range of from about 8.0 to 9.5 for fresh fly ash samples, and from about 9.5 to 10.5 for stored fly ash (i.e. from ponds or landfills). The increased pH appeared to be more effective in breaking down flocs from stored fly ash, which appeared more resistant to dispersion than flocs from fresh fly ash. The amount of superplasticizer required for full deflocculation of samples typically varies from 3.0 to 7.0 g per kg of fly ash.

EXAMPLE 8

Experiments were conducted to evaluate suitability of fly ash filler material obtained using the method of this invention as a specialty additive for concrete and cement. As shown in Table 3, the small diameter of the product and its consequently large surface area does not produce the delay in strength that a normal Class F fly ash produces. The strength curve for fly ash filler obtained using the method of this invention resembles that produced by silica fume, a costly and valuable cement additive. Silica fume has a very high surface area which contributes to its reactivity in cement and concrete, but its irregular form also undesirably increases the viscosity of the concrete, making it "pastey." Advantageously, the shape (roundness) of the fly ash filler product also serves to decrease the viscosity of the cement, thereby reducing the amount of water required to meet a specified flow rate.

TABLE 3

ASTM-C-618 Strength Index data for products of technology. The Hi S feed is presented for comparison purposes.

|  | % water required | 1 day S.I. | 3 day S.I. | 7 day S.I. | 28 day S.I. | 56 day S.I. |
|---|---|---|---|---|---|---|
| Hi S Feed | 93% | 81% | 89% | 87% | 100% | 116% |
| Hi S Product | 92% | 90% | 104% | 104% | 117% | 137% |
| Low S Product | 101% | 80% | 100% | 101% | 119% | 147% |
| Control | 100% | 100% | 100% | 100% | 100% | 100% |

EXAMPLE 9

The filler material obtained using the method of this invention has proven to be a very high quality mineral filler for polymer application. The very small and uniform particle size of the product provides enhanced strength to the filled product. Its smooth round shape provides low air entrainment during compounding and reduced melt viscosity compared to other mineral fillers and unprocessed fly ash. The smooth round particles also provide for the lowest surface area to volume ratio for any given size range, which results in the lowest demand for coupling chemicals for the production of functionalized fillers.

The foregoing description of preferred embodiments of the invention has been presented for purposes of illustration and description. It is not intended to be exhaustive or to limit the invention to the precise form disclosed. Obvious modifications or variations are possible in light of the above teachings. The embodiments were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A method of providing fly ash with a mean particle size in the range of 2–4 $\mu$m, comprising:

slurrying fly ash with water in the presence of a superplasticizer;

bringing said slurry to a pH of 7.5–10.5; and elutriating the resulting slurry in a column/hydraulic classifier.

2. The method set forth in claim 1, wherein said slurry contains a concentration of solids of from about 5.0% to about 10.0%.

3. The method set forth in claim 1, wherein said slurry contains a concentration of solids of from about 5.0% to about 7.0%.

4. The method set forth in claim 1, wherein said superplasticizer is selected from a group consisting of sulphonated naphthalene-formaldehyde condensate, sulphonated melamine-formaldehyde condensate, polycarboxylates and any mixture thereof.

5. The method set forth in claim 1, including adding said superplasticizer to said fly ash at a rate of between substantially 1.0–8.0 g/kg of fly ash.

6. The method set forth in claim 1, including adding said superplasticizer to said fly ash at a rate of between substantially 3.0–7.0 g/kg of fly ash.

7. The method set forth in claim 1, including adding said superplasticizer to said fly ash near but below saturation.

8. The method set forth in claim 1, including subjecting said slurry to hydraulic classification prior to addition of said superplasticizer.

9. The method set forth in claim 1, including subjecting said slurry to froth flotation prior to addition of said superplasticizer.

10. The method set forth in claim 1, including operating said column/hydraulic classifier under laminar flow conditions.

11. A method of providing fly ash with a mean particle size in the range of 2–4 $\mu$m, comprising:

slurrying fly ash with water in the presence of a superplasticizer;

bringing said slurry to a pH of 8.0–8.9; and elutriating the resulting slurry in a column/hydraulic classifier.

12. The method set forth in claim 11, wherein said slurry contains a concentration of solids of from about 5.0% to about 10.0%.

13. The method set forth in claim 11, wherein said slurry contains a concentration of solids of from about 5.0% to about 7.0%.

14. The method set forth in claim 11, wherein said superplasticizer is selected from a group consisting of sulphonated naphthalene-formaldehyde condensate, sulphonated melamine-formaldehyde condensate, polycarboxylates and any mixture thereof.

15. The method set forth in claim 11, including adding said superplasticizer to said fly ash at a rate of between substantially 1.0–8.0 g/kg of fly ash.

16. The method set forth in claim 11, including adding said superplasticizer to said fly ash at a rate of between substantially 3.0–7.0 g/kg of fly ash.

17. The method set forth in claim 11, including adding said superplasticizer to said fly ash near but below saturation.

18. The method set forth in claim 11, including subjecting said slurry to hydraulic classification prior to addition of said superplasticizer.

19. The method set forth in claim 11, including subjecting said slurry to froth flotation prior to addition of said superplasticizer.

20. The method set forth in claim 11, including operating said column/hydraulic classifier under laminar flow conditions.

* * * * *